(12) United States Patent
Chung

(10) Patent No.: US 10,160,507 B2
(45) Date of Patent: Dec. 25, 2018

(54) REAR TRUCK AND METHOD

(76) Inventor: Rasyad Chung, Berkeley, CA (US)

( * ) Notice: Subject to any disclaimer, the term of this patent is extended or adjusted under 35 U.S.C. 154(b) by 623 days.

(21) Appl. No.: 12/319,407

(22) Filed: Jan. 7, 2009

(65) Prior Publication Data

US 2009/0273152 A1 Nov. 5, 2009

Related U.S. Application Data

(60) Provisional application No. 61/010,233, filed on Jan. 7, 2008.

(51) Int. Cl.
| | |
|---|---|
| *A63C 17/01* | (2006.01) |
| *B62K 3/00* | (2006.01) |
| *A63C 17/00* | (2006.01) |
| *B62K 15/00* | (2006.01) |

(52) U.S. Cl.
CPC .......... *B62K 3/002* (2013.01); *A63C 17/0093* (2013.01); *A63C 17/012* (2013.01); *B62K 15/006* (2013.01)

(58) Field of Classification Search
CPC . A63C 17/012; A63C 17/013; A63C 17/0093; B62K 3/002
USPC .......................................... 280/11.27, 87.042
See application file for complete search history.

(56) References Cited

U.S. PATENT DOCUMENTS

| | | | | |
|---|---|---|---|---|
| 1,640,134 A * | 8/1927 | Salberg | ....................... | 280/11.19 |
| 3,331,612 A * | 7/1967 | Tietge | ........................ | 280/11.28 |
| 4,084,831 A * | 4/1978 | Akonteh et al. | ......... | 280/11.215 |
| 4,125,268 A * | 11/1978 | Varner et al. | ............... | 280/11.28 |
| 4,159,830 A * | 7/1979 | Solimine | ..................... | 280/11.28 |
| 4,180,278 A * | 12/1979 | Gottlieb | .................... | 280/87.042 |
| 4,183,546 A * | 1/1980 | Heilig | ....................... | 280/87.042 |
| 4,398,734 A * | 8/1983 | Barnard | ..................... | 280/11.28 |
| 4,861,054 A * | 8/1989 | Spital | ............................ | 280/221 |
| 5,154,436 A * | 10/1992 | Jez et al. | .................. | 280/87.042 |
| 5,165,710 A * | 11/1992 | Runyon | .................... | 280/87.042 |
| 6,286,843 B1 * | 9/2001 | Lin | ............................... | 280/11.28 |
| 6,520,517 B1 * | 2/2003 | Chung et al. | ............. | 280/87.042 |
| 6,793,224 B2 * | 9/2004 | Stratton | .................... | 280/87.042 |
| 6,979,007 B1 * | 12/2005 | Hosoda | ..................... | 280/87.042 |
| 7,063,341 B2 * | 6/2006 | Tsai | ......................... | 280/87.041 |
| 7,083,178 B2 * | 8/2006 | Potter | ....................... | 280/87.042 |
| 7,316,408 B2 * | 1/2008 | McClain | .................. | 280/87.042 |
| 7,341,260 B1 * | 3/2008 | Hosoda et al. | ............ | 280/11.19 |
| 7,810,825 B2 * | 10/2010 | Cole | ........................ | 280/87.042 |
| 9,145,030 B2 * | 9/2015 | Williams | .............. | B60B 35/025 |
| 2005/0051983 A1 * | 3/2005 | Williams | .................. | 280/87.042 |
| 2005/0167938 A1 * | 8/2005 | Chung et al. | ............ | 280/87.042 |
| 2005/0269794 A1 * | 12/2005 | Lukes | ....................... | 280/87.042 |
| 2006/0226620 A1 * | 10/2006 | Cole | ........................ | 280/87.042 |

(Continued)

*Primary Examiner* — Emma K Frick
(74) *Attorney, Agent, or Firm* — Adams Law Office; Sharon Adams

(57) ABSTRACT

A compact lean steering truck assembly that provides deep deck lean capability. The lean steering truck assembly may be integrated into a four wheeled scooter. A pivotal coupling in the front hanger allows independent steering of the front and rear wheel assemblies. Front steering is controlled by the rider's hands twisting the handle bars to the right or left or straight ahead. Rear steering is controlled by the rider's feet and hands leaning the deck and handle bars relative to the plane of the ground. The ratio of deck lean to rear steering is a function of the hanger pivot axis angle but in general terms the deeper the deck lean the greater the rear wheel steering.

6 Claims, 9 Drawing Sheets

(56) References Cited

U.S. PATENT DOCUMENTS

2009/0273152 A1* 11/2009 Chung .................... 280/87.042
2010/0314851 A1* 12/2010 Palmer et al. ........... 280/87.042

* cited by examiner

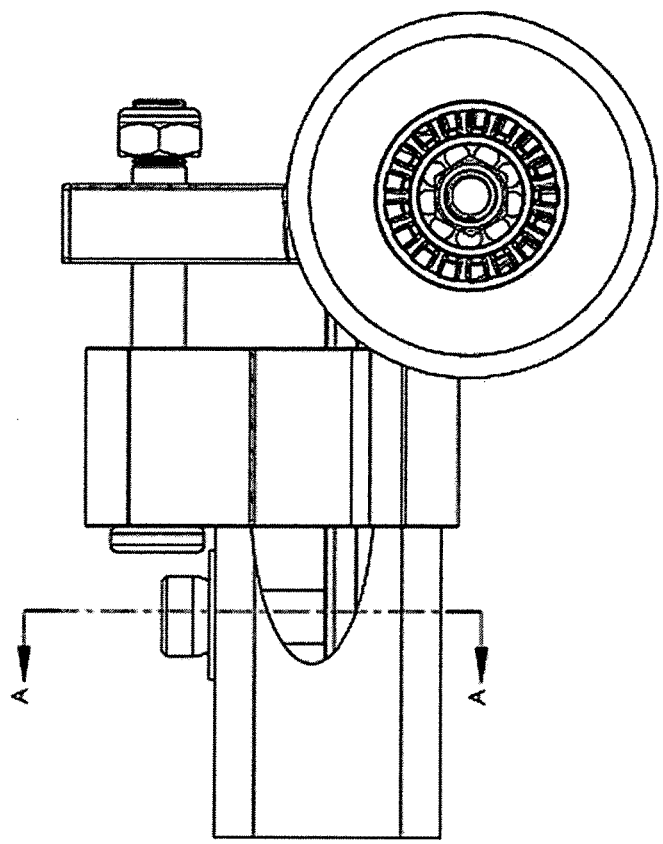
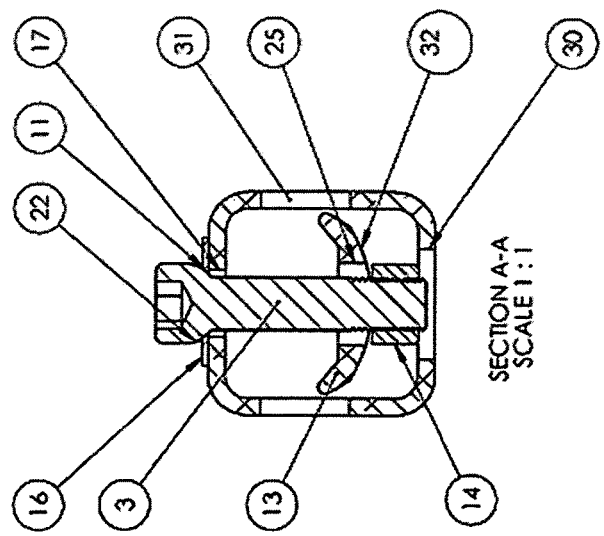
Fig. 6

REAR TRUCK AND METHOD

RELATED PATENT APPLICATIONS

This application is a non-provisional patent application of provisional patent application, filed Jan. 7, 2008, and having Ser. No. 61/010,233. Benefit of the Jan. 7, 2008 date is hereby claimed.

1. Field of the Invention

Embodiments of the present invention relates to a lean steering truck assembly for riding devices such as scooters, skateboards, and roller skates and more particularly to a lean steering truck assembly including a structure for a floating king pin design to provide deep deck leaning capabilities during use. Embodiments of the present invention further relate to a method for producing deep deck leaning capabilities during use of a transportation vehicle.

2. Background of the Invention

Skateboards utilize lean steering as the method of controlling the direction of travel such that leaning or banking the deck causes the wheels to steer. Typically, skateboards use two identical truck assemblies mounted inline, on the bottom surface and toward the ends of the skateboard deck with the mounting orientation of the trucks mirrored relative to each other.

Conventional lean steering of skateboards is such that leaning the deck to the right causes the front wheels (relative to the direction of travel) to steer to the right (toward the inside of the up-coming turn) while at the same time the rear wheels to steer to the left (toward the outside of the up-coming turn.) The reverse is also true in that leaning the deck to the left causes the front wheels to steer to the left while at the same time the rear wheels steer to the right. On a skateboard it does not matter which end of the board is pointing forward, leaning right results in a right turn and leaning left results in a left turn.

Conventional lean steering dynamics as described above is the same with scooters except that typically only one lean steering truck is used. In the case of a scooter utilizing a lean steering truck assembly mounted in the front leaning the scooter to the right will cause the front wheels to steer to the right and leaning the deck to the left will cause the front wheels to steer to the left. On the other hand, in the case of a scooter utilizing a lean steering truck assembly mounted in the rear then leaning the deck to the right will cause the rear wheels to steer to the left and leaning the deck left will cause the rear wheels to steer to the right.

A conventional lean steering truck is composed of a truck base that mounts underneath the skateboard deck and a truck hanger with opposed axle members for carrying a pair of opposed wheels. These two primary elements are assembled with two pins, a king pin and a pivot pin. The king pin is typically a bolt that protrudes from the truck base that is tightly located within a bore in the truck base such that it remains aligned with the truck base. The pivot pin is typically a fixed feature of the truck hanger with a ball end that protrudes upwardly and is received and loosely supported by a cup shaped elastomeric bushing housed in the truck base.

Another feature of the truck hanger is a bore that the king pin passes through such that the truck hanger is able to wobble loosely about the king pin. Constraining the wobbly motion of the hanger relative to the truck base and king pin are one or two elastomeric bushings and washers mounted concentrically on the king pin and held in place by tension from a nut threaded onto one end of the king pin. The elastomeric bushings provide a return spring force that tends to locate the bore of the hanger in alignment with the king pin. Tightening the king pin nut squeezes the elastomeric bushings and increases the pressure on the bore of the truck hanger reducing the range of motion and increasing the force required to move the truck hanger relative to the truck base and king pin.

A general description of the function of a conventional lean steering truck follows. As the deck leans it rotates about a longitudinal axis, the base and king pin being fixed to the deck lean in unison with the deck. Being fixed to the truck base the king pin moves to the side with a pendulum motion. The truck hanger is constrained by contact of the two opposed wheels with the surface of the ground and by two virtual pivot points.

The first virtual point is the nominal center of the ball and socket connection between the pivot pin and the elastomeric pivot cup bushing of the base mounting bracket. The second virtual point lies upon the king pin axis at the nominal center of the bore of the truck hanger. A virtual axis of rotation is created that intersects both virtual pivot points. It is about this virtual axis, named by various sources as the "hanger pivot axis" or "steering axis" that the truck hanger rotates about when the deck is leaned. The location of both the virtual points and the resultant angle of the hanger pivot axis are defined by the geometry of any particular lean steering truck and how the truck is mounted relative to the deck. The angle of the hanger pivot axis in turn defines the lean steering ratio or how much steering will result from a given amount of deck lean.

Common to all conventional lean steering truck designs is the existence of a hanger pivot axis angle, typically ranging from 25 to 55 degrees relative to the longitudinal axis about which the truck hanger rotates. Also common to most conventional lean steering truck designs are some type of spring element for returning the deck to a central and neutral position. Various designs and materials are used to create this return to center force that include elastomeric bushings or metal springs under compression while others use torsionally loaded springs or bushings.

Lean steering trucks as described above are designed for a limited range of leaning deck motion which is further reduced by the limited adjustment of the elastomeric bushings. In addition, typical applications have the lean steering trucks mounted to the bottom of a skateboard deck or to the bottom of a shoe as with skateboards and roller skates which places the bottom of the deck above the elevation of the wheels thereby raising the center of gravity and creating a high longitudinal roll axis of the deck. Such with the lean steering truck mounted to the bottom of a deck also limit the range of leaning motion of the deck due to interference and hazardous contact between the deck and the wheels upon leaning. Typical lean steering trucks for skateboards are designed as stand alone components that can be fitted to a variety of skateboard decks and are not easily integrated into the design of a metal framed scooter.

SUMMARY OF EMBODIMENTS OF THE INVENTION

Embodiments of the present invention provide a compact lean steering truck assembly that provides deep deck lean capability. One embodiment the invention is integrated into a four wheeled scooter utilizing the same ride dynamics as taught by U.S. Pat. No. 6,520,517 which has a common assignee and is fully incorporated herein by reference as if repeated in verbatim immediately hereafter. Like the riding device of U.S. Pat. No. 6,520,517, a pivotal coupling in the front hanger allows independent steering of the front and rear wheel assemblies. Front steering is controlled by the rider's hands twisting the handle bars to the right or left or straight ahead. Rear steering is controlled by the rider's feet and hands leaning the deck and handle bars relative to the plane of the ground. The precise ratio of deck lean to rear steering is a function of the hanger pivot axis angle but in general terms the deeper the deck lean the greater the rear wheel steering. The ride dynamics of U.S. Pat. No. 6,520,517 are such that the rider is free to steer the front wheels to the right or left or straight forward independent of the deck lean dependent rear wheel steering.

An object of various embodiments of the invention is to provide integration of a lean steering truck assembly with a metal or tubular frame.

Another object of various embodiments of the invention is to provide a compact design with improved ground clearance so to reduce the possibility of hazardous contact of the king pin and king pin nut with ground irregularities or the transitions of a skate park, curbs, rails and the like.

A further object of various embodiments the invention is to provide greater range of leaning motion for the deck so as to better emulate the deep leaning, carving sensations associated with snowboarding and surfing.

Another further object of various embodiments the invention is to improve stability by lowering the center of gravity and lowering the longitudinal roll axis of the deck through the use of unique geometry and floating king pin design.

Another further object of various embodiments of the invention is to provide greater range of adjustment in preloading the elastomeric bushings.

These objects and advantages of various embodiments of the invention, together with the various ancillary objects and features which will become apparent to those skilled in the art as the following description proceeds, are attained by the methods and assemblies of the various embodiments present invention.

BRIEF DESCRIPTION OF THE DRAWINGS

FIG. 6 shows a ground level side view and a detailed frontal cross-section view of embodiments of the invention not leaned. The deck 2, truck hanger 9, floating king pin bushing 15, wheels 10 and other parts are removed from the cross-section for clarity.

Figure 1:
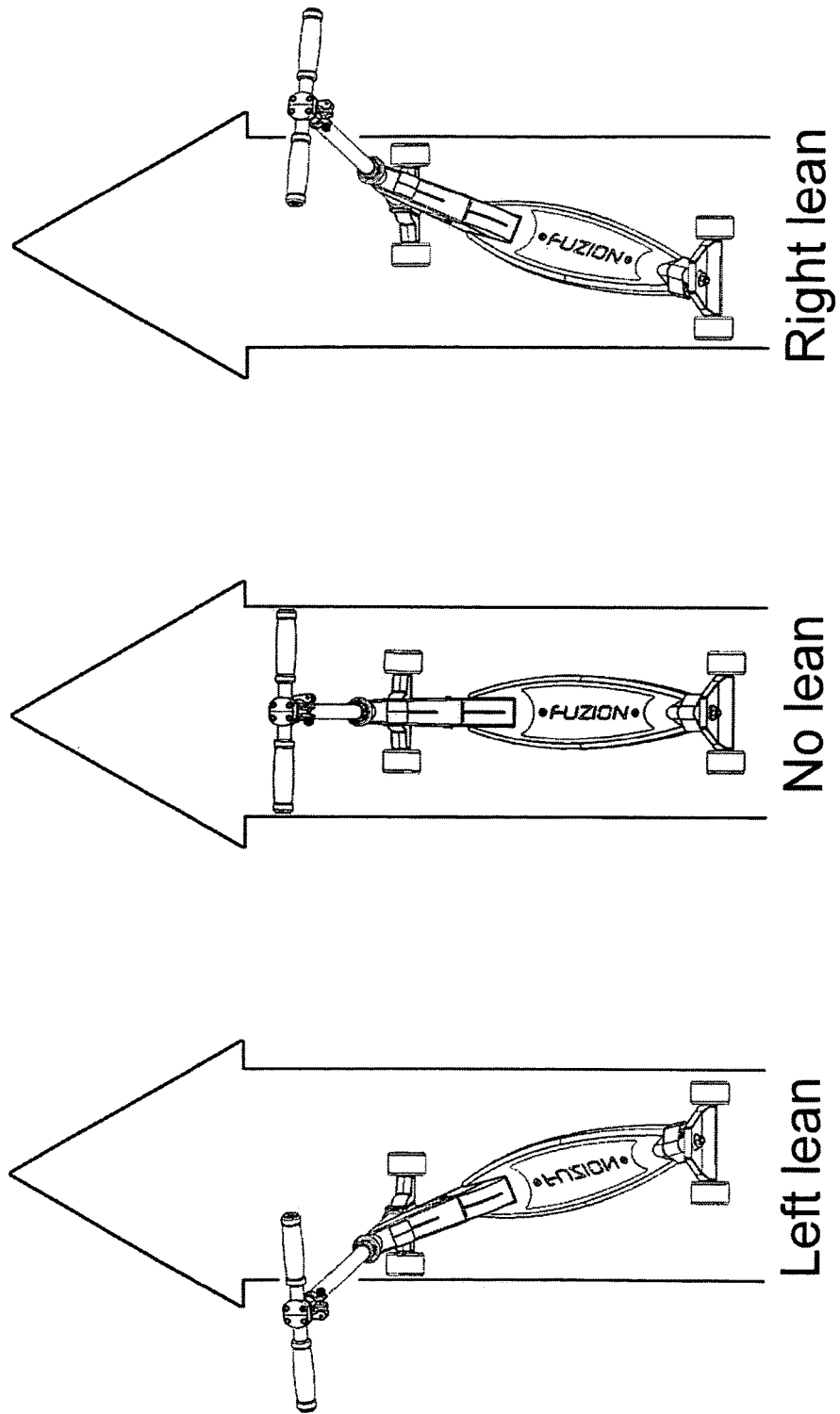
FIG. 1 shows three riding views of a scooter with the front wheels steering straight ahead and all four wheels rolling straight forward. The center image shows the scooter not leaning, on the right the scooter is leaning to the right and on the left it is leaning to the left. Note that rear wheels are steering in the conventional manner for a lean steering truck assembly. When the deck is leaned to the right, the rear wheels steer to the left and visa versa. Also note that when the scooter is leaned and the rear wheels are steering, it is still possible to roll straight forward in a yawed orientation by simply counter-steering with the front wheels to compensate for the rear wheel steering.
Figure 2:
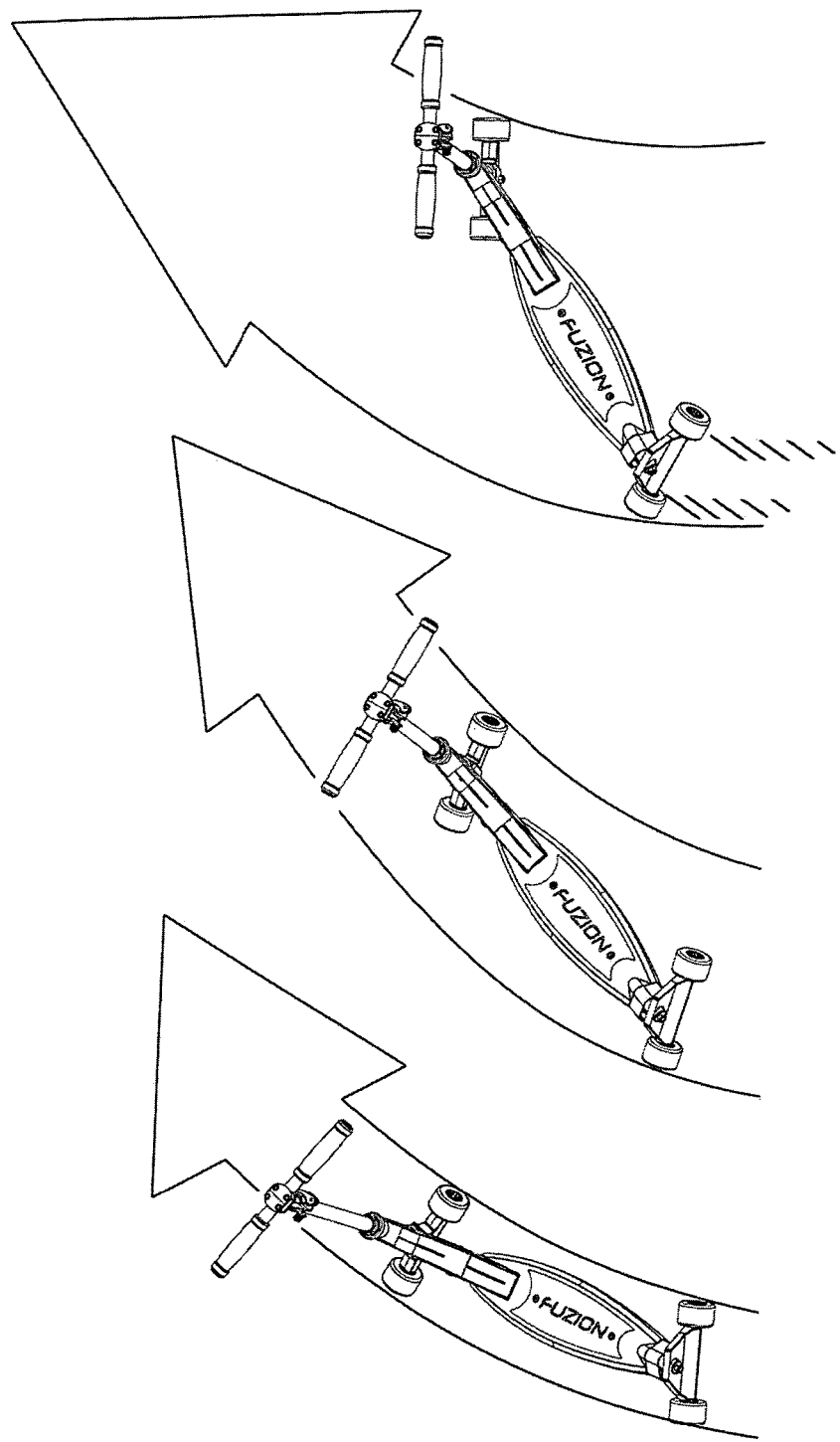
FIG. 2 shows three riding views of a scooter leaned to the right in progressively greater amounts. The arrows on the ground plane illustrate the direction of travel and the overall track width of the scooter in a turn. The image on the left shows a conventional right turn with the rear wheels steering left toward the outside of the turn and the front wheels steering right toward the inside of the turn. In this conventional right turn the rear wheels follow the arcing path of the front wheels in a relatively narrow track. The center image shows the rear wheels steering left and the front wheels counter-steering slightly with the scooter turning right in a yawed orientation. The image on the right shows the scooter at maximum lean with the rear wheels steering left and sliding toward the outside of the turn having lost partial traction with the ground. The right image shows the front wheels at maximum counter-steer, unaffected by deck lean, and steering into the direction of the sliding rear wheels thus maintaining an improved measure of control.
Figure 3:
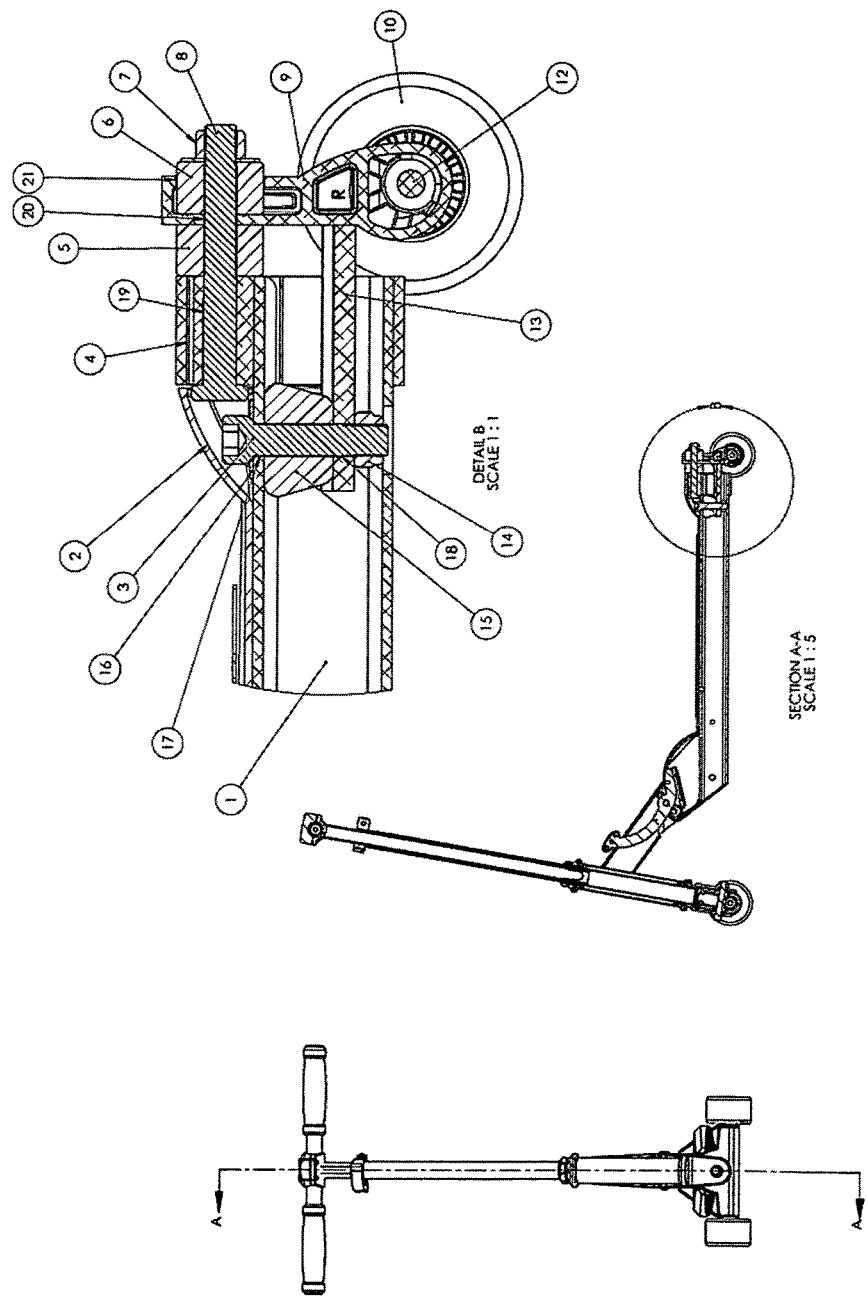
FIG. 3 shows a front view, a right plane section view, and a close-up section view of embodiments of the invention, not leaned.
Figure 4:
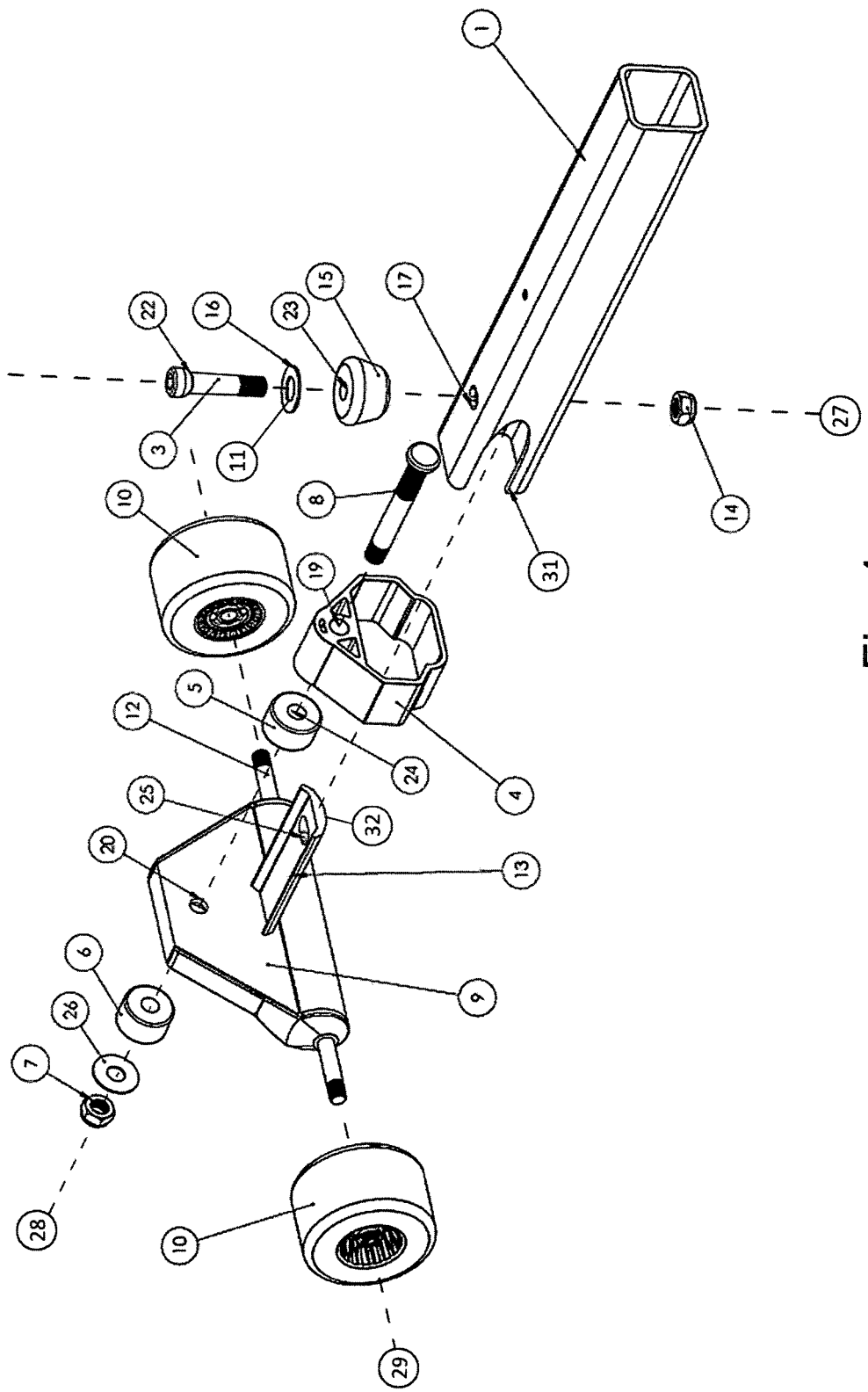
FIG. 4 shows a perspective exploded view of embodiments of the invention with the Deck 2 removed for clarity.
Figure 5:
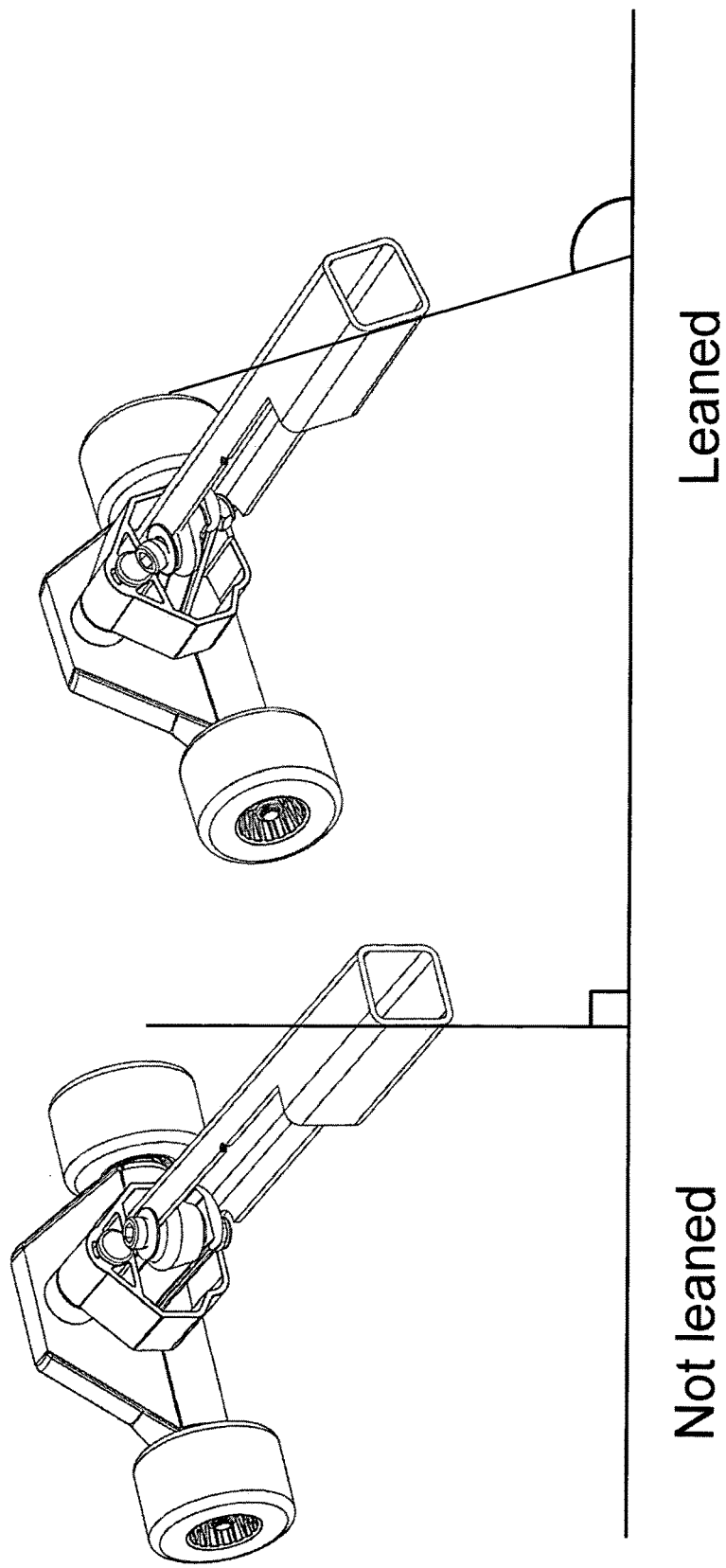
FIG. 5 shows views of embodiments of the invention leaned to the right and not leaned. The Deck 2 is removed and the Frame 1 is cutaway for clarity. Lines indicate orientation of the frame with the ground plane. The leaned image on the right illustrates the asymmetrical compression of the floating king pin bushing 15.
Figure 7:
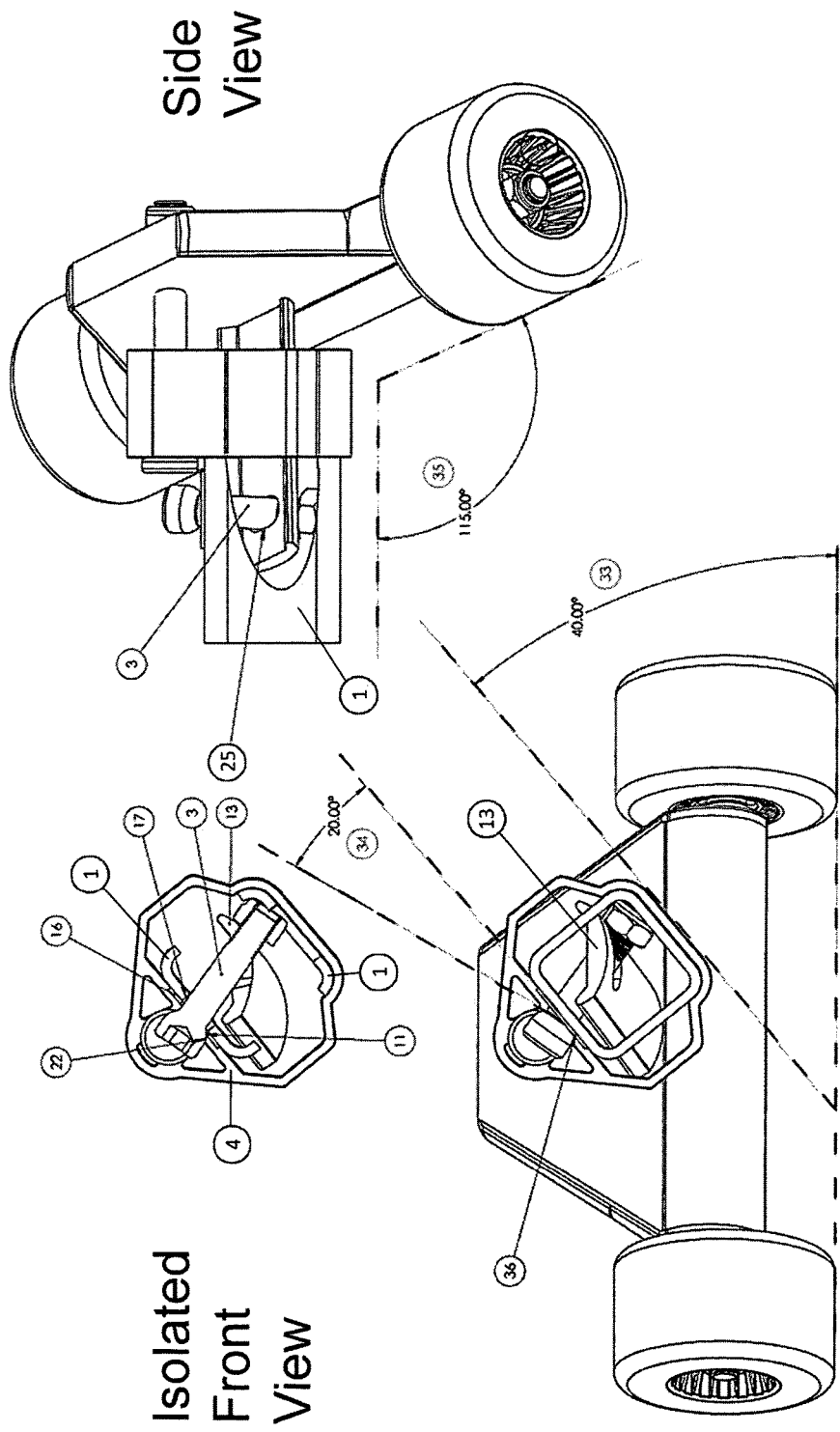
FIG. 7 shows an isolated front view and a front ground view of embodiments of the invention leaned to the right as indicated by angle 33. Note that the frame 1 and fixed king pin base 4 lean in unison being fixed together. The deck 2 and floating king pin bushing 15 are removed for clarity. Note the articulation and pendulum motion of the floating king pin 3 relative to the frame 1 and control arm 13 as indicated by angle 34 as well as the sideways arcing motion of control arm 13 relative to the frame 1. The side view also leaned to the right shows the resultant steering of the rear wheels relative to frame 1 as indicated by angle 35. The side view also shows the motion of floating king pin 3 within the elliptical bore 25 of the control arm 13.
Figure 8:
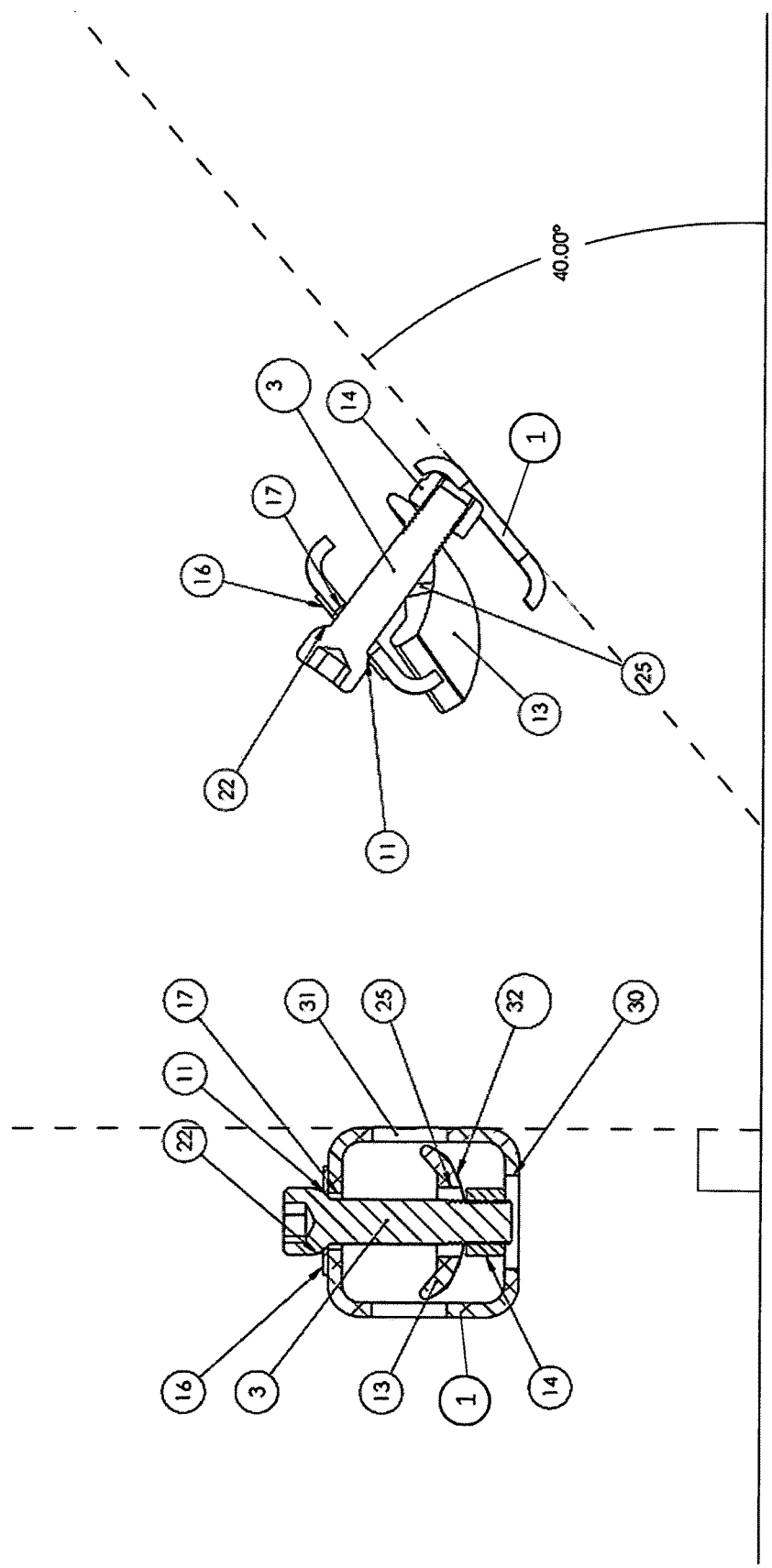
FIG. 8 shows two detailed front section views from the ground level of the floating king pin assembly in isolation. The left image is of the assembly not leaned. In this image, note the normal alignment of all components. The right image shows frame 1 leaned to the right as indicated by the reference lines and the angle formed between the frame 1 and the ground. The floating king pin 3 passes concentrically through floating king pin washer 16 such that the radiused lower surface 22 of the floating king pin head is supported on the top inside edge 11 of the floating king pin washer 16 acting as a hemispheric ball joint. The floating king pin then passes through elliptical bore 17 in the frame 1 so shaped as to allow pendulum, pivoting and waffling motion of the floating king pin 3, through floating king pin bushing bore 23 removed here but shown in FIG. 4, through elliptical bore 25 in the control arm 13 also so shaped so as to allow pendulum, pivoting and wobbling motion of the floating king pin 3, and is secured by floating king pin nut 14 which is shown in tangent contact with the radiused lower surface 32 of control arm 13. The radiused lower surface 32 of the control arm 13 is so shaped to facilitate the pendulum, pivoting and wobbling motion of the floating king pin 3 while also being adjustable by threading in and out to set the initial loading of the elastomeric floating king pin bushing 15. Floating king pin nut 14 utilizes typical thread lock design to maintain secure fastening and not become loose in use.
Figure 9:
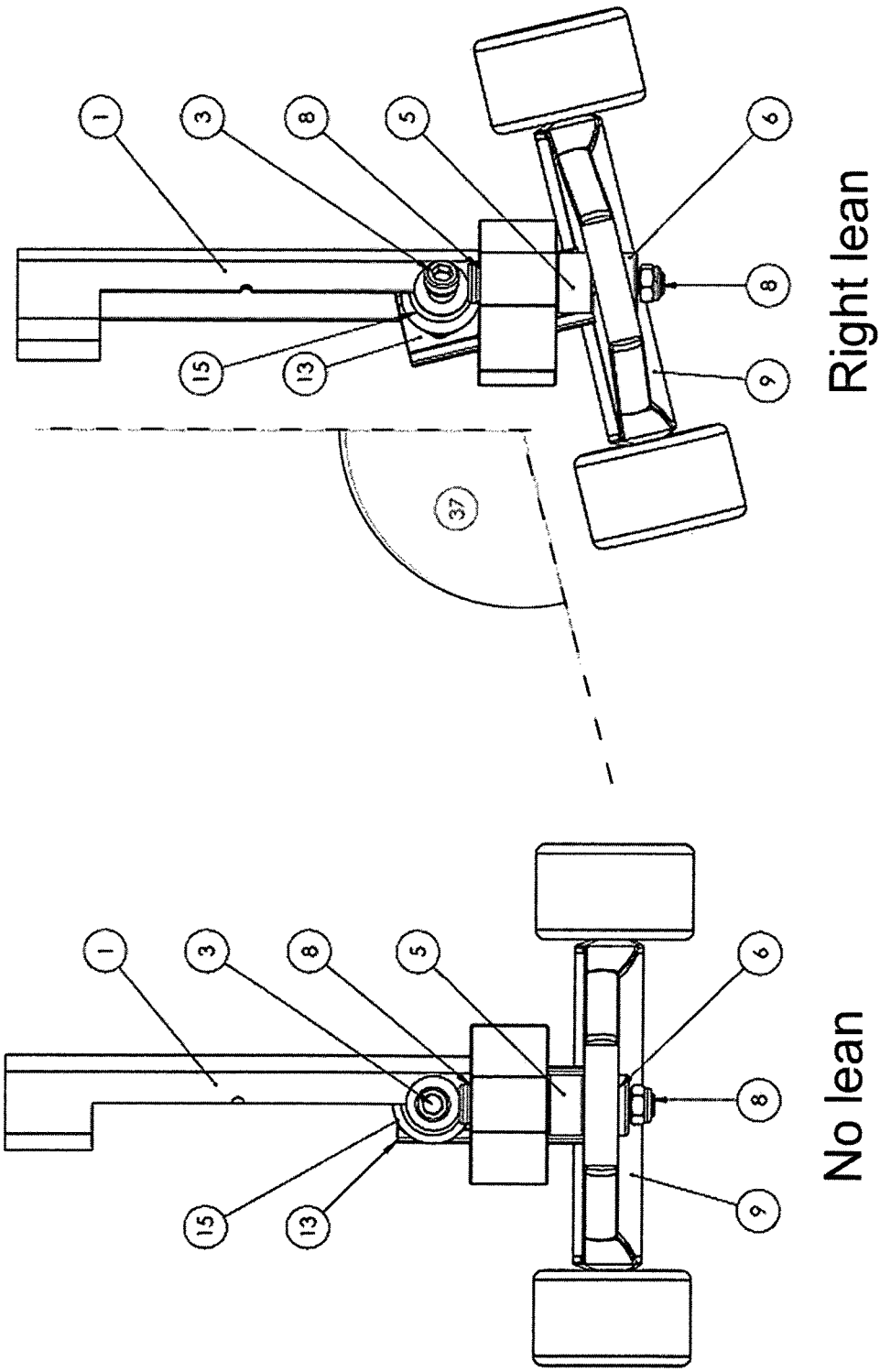
FIG. 9 shows top views of the invention not leaned and leaned to the right. Deck 2 is removed and frame 1 is partially cut away for clarity. This figure highlights the steering action of the truck hanger 9 as indicated by angle 37 upon sideways motion of the control arm 13 as well as the motion of truck hanger 9 relative to the other components. Note that the fixed king pin 8 rotates about its own axis in unison with leaning of the deck. Also note the asymmetrical compression of both fixed king pin elastomeric bushings 5 and 6 in front of and partially inside of truck hanger 9.

Common reference numerals are used throughout the drawings and detailed description to indicate like elements.

DETAILED DESCRIPTION OF THE EMBODIMENTS OF THE INVENTION

In the description herein, numerous specific details are provided, such as examples of components and/or methods, to provide a thorough understanding of the embodiments of the present invention. One skilled in the relevant art will recognize, however, that an embodiment of the invention may be practiced without one or more of the specific details, or with other apparatus, systems, assemblies, methods, components, materials, parts, and/or the like. In other instances, well-known structures, materials, or operations are not specifically shown or described in detail to avoid obscuring aspects of the embodiments of the present invention.

While the lean steering (tuck) assembly will be described by referencing various parts of a truck, it is to be understood that the lean steering assembly may be adapted for or employed with any suitable transportation device that is to lean when desired. For purposes of various embodiments of the invention, the lean steering assembly will be employed with a truck and will be designated or called lean steering truck assembly.

Embodiments of the invention are a lean steering truck assembly that utilizes a floating king pin design which moves from side to side in a pendulum motion as well as pivots and wobbles, thus offering a broader range of leaning motion than is currently available with typical king pin and bushing based lean steering trucks, commonly known as skateboard trucks.

The deck 2 is securely mounted to the frame 1 such that both components move in unison. The frame 1 is a tubular member supporting the rider and spanning the front and rear wheel assemblies. The frame 1 is, on the forward end, mounted to a folding mechanism, a neck, and a headtube and shall be described collectively as frame elements. A handle bar and riser assembly are connected to a steer tube and fork and shall be described collectively as the steering column. A headset bearing assembly is mounted to the top and bottom of the headtube and rotatably connects the steering column to the frame elements such that the steering column and frame elements are each able to freely rotate about a common longitudinal axis relative to the other. The front hanger is pivotally mounted to a fork on an axis that is normal to the common longitudinal. As with U.S. Pat. No. 6,520,517, the front wheels maintain uniform contact with the ground during normal riding conditions and can be steered via the handle bars independent of leaning of the frame elements and rear wheel steering.

The head of floating king pin 3 has a radius lower surface 22 that acts as a hemispheric bearing surface with the top inside edge 11 of floating king pin washer 16. Floating king pin washer 16 sits flush on the top surface of frame 1 over elliptical bore 17. The floating king pin 3 is mounted through the center of washer 16 and through elliptical bore 17 such that the head of the floating king pin 3 is unable to pass through either washer 16 or elliptical bore 17 wherein body of floating king pin 3 remains free to move in a pendulum manner as well as pivot and wobble. Floating king pin bushing 15 is elastomeric and mounted such that bore 23 is concentric with the floating king pin 3 and such that the top surface of floating king pin bushing 15 is flush with the inner surface of the top of frame 1 while the bottom surface is flush with the top of truck hanger control arm 13. The threaded end of floating king pin 3 passes through elliptical bore 25 of control arm 13 and is fastened on the radiused bottom side of control arm 13 by floating king pin nut 14 such that the floating king pin 3 is still able to move in a pendulum manner as well as pivot and wobble. The end of the truck hanger control arm 13 at the elliptical bore 25 is in turn constrained by contact with the bottom surfaces of floating king pin bushing 15 and by contact with the top surface of the floating king pin nut 14 such that control arm 13 moves with the pendulum and wobbling motion of floating king pin 3.

The rear wheel assemblies 10 contain ball bearings and are oppositionaly mounted to axle 12 on either side of truck hanger 9. In the current embodiment, truck hanger 9 and control arm 13 are fixed together by welding or other means, function as a single unit, and move in unison. Alternative embodiments are imagined with a singular casting or fabrication that combines elements while maintaining the same function.

The fixed king pin base 4 is securely attached to frame 1 by welding or other means. Fixed king pin 8 is press fit or otherwise mounted into bore 19 such that a length of fixed king pin 8 protrudes rearward from the rear surface of the fixed king pin base 4 such that the fixed king pin 8 only moves in unison frame 1. A forward fixed king pin bushing 5 is mounted concentric with the fixed king pin 8, flush on the front side with the rear surface of the fixed king pin base 4, and flush on the rear side with the front surface of the truck hanger 9. The fixed king pin passes through an oversized bore 20 in the truck hanger 9. The rear fixed king pin bushing 6 is mounted concentric with the fixed king pin 8 flush with a rear surface of truck hanger 9. Fixed kin pin washer 26 and fixed king pin nut 7 are threaded onto the end of fixed king pin 8. The range of motion of the invention within the constraints of a given overall geometry is controlled by the durometer and shape of the elastomeric king pin bushings, the fit between the elastomeric bushings and all contact surfaces, and the tightness of both the fixed and floating king pin nuts.

At rest the scooter remains vertical with all four wheels on the ground. In this the not leaned condition where the top surface of frame 1 would be nominally parallel with the ground and the floating king pin axis would be nominally perpendicular or normal with the ground. At rest all elastomeric bushings are uniformly loaded with only a minimum compression present from the assembly tightness of the king pin nuts. Differential down force on frame 1 causes asymmetrical compression of the floating king pin bushing 15 which causes floating king pin 3 to begin its pendulum motion sideways. When the frame elements lean, the fixed king pin 8 rotates about its axis within elastomeric fixed king pin bushings 5 and 6 and within oversized bore 20 of the truck hanger 9. The truck hanger 9 and control arm 13 are constrained by a return force from the ground and wheels 10 and as well by fixed king pin bushings 5 and 6. So constrained, the pendulum and wobble motion of floating king pin 3 forces truck hanger 9 to move in a sideways arc relative to the frame elements which results in steering of the rear wheels.

Geometry of the invention is adjusted to optimize the balance of front and rear steering and for safety so that the deck and frame never contact wheels when riding.

Reference throughout this specification to "one embodiment", "an embodiment", or "a specific embodiment" means that a particular feature, structure, or characteristic described in connection with the embodiment is included in at least one embodiment of the present invention and not necessarily in all its embodiments. Therefore, the respective appearances of the phrases "in one embodiment", "in an embodiment", or "in a specific embodiment" in various places throughout this specification are not necessarily referring to the same embodiment. Furthermore, the particular features, structures, or characteristics of any specific embodiment of the present invention may be combined in any suitable manner with one or more other embodiments. It is to be understood that other variations and modifications of the embodiments of the present invention described and illustrated herein are possible in light of the teachings herein and are to be considered as part of the spirit and scope of the present invention.

Additionally, any arrows in the drawings/figures should be considered only as exemplary, and not limiting, unless otherwise specifically noted. Furthermore, the term "or" as used herein is generally intended to mean "and/or" unless otherwise indicated. Combinations of components or steps will also be considered as being noted, where terminology is foreseen as rendering the ability to separate or combine is unclear.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The foregoing description of illustrated embodiments of the present invention, including what is described in the Abstract, is not intended to be exhaustive or to limit the invention to the precise forms disclosed herein. While specific embodiments of, and examples for, the invention are described herein for illustrative purposes only, various equivalent modifications are possible within the spirit and scope of the present invention, as those skilled in the relevant art will recognize and appreciate. As indicated, these modifications may be made to the present invention in light of the foregoing description of the illustrated embodiments of the present invention and are to be included within the spirit and scope of the present invention.

What is claimed is:

1. A rear truck assembly comprising:
    a floating king pin with a radiused lower surface on a head of the floating king pin supported by a top inside edge of a washer, where the floating king pin passes through the washer, through an elliptical bore in a frame, through an elastomeric king pin bushing via a king pin bushing bore, through an elliptical bore in a control arm, and is secured with a floating king pin nut in tangent contact with a radiused lower surface of the control arm where the radiused lower surface of the control arm facilitates a pendulum, pivoting, and wobbling motion of the floating king pin,
    the control arm is securely connected with a hanger with an axle below the control arm, and an oversized bore above the control arm, wherein each end of the axle is connected with a laterally spaced wheel assembly resting on ground,
    the oversized bore hole sized to receive a fixed king pin where the fixed king pin and the floating king pin are perpendicular to each other and the fixed kin pin is nominally parallel with the ground when in use,
    a base securely connected with the frame and disposed between the hanger and the floating king pin, where the base has a fixed king pin bore,
    a deck securely connected with the frame where the deck is a tubular member capable of supporting a rider, spanning the rear truck assembly and a forward wheel assembly, and where the deck, frame, and base move in unison,
    the fixed king pin passes through the base via the fixed king pin bore, through a forward fixed king pin bushing, through the oversize bore in the hanger, through a rear fixed king pin bushing, connecting with a fixed king pin nut, wherein the base, frame, and deck rotate around the fixed king pin in response to lean steering input.

2. The rear truck assembly of claim 1 wherein the floating king pin nut secures the floating king pin using a thread lock, and the initial loading of the elastomeric king pin bushing is adjustable by threading the king pin in and out.

3. The rear truck assembly of claim 1 wherein the fixed king pin has an axis that is nominally parallel with the ground when the wheels are in contact with the ground, and the fixed king pin rotates about its own axis in unison with the deck, frame, and base in response to differential down force on the frame.

4. The rear truck assembly of claim 3 where when in use the hanger and control arm are constrained by a return force from the wheels in contact with the ground, and where in response to differential down force on the frame the floating king pin pendulums, pivots, and wobbles thereby moving hanger in a sideways arc relative to the frame, resulting in steering of the rear wheels.

5. The rear truck assembly of claim 3 where when in use the hanger and control arm are constrained by a return force from the wheels in contact with the ground, and where in response to differential down force on the frame the elastomeric bushing is asymmetrically compressed causing the floating king pin to pendulum thereby moving hanger in a sideways arc relative to the frame, resulting in steering of the rear wheels.

6. A method for deep deck lean and steering of a transportation vehicle with a rear truck assembly comprising
    a floating king pin with a radiused lower surface on a head of the king pin supported by a top inside edge of a washer, where the floating king pin passes through the washer, through an elliptical bore in a frame, through an elastomeric king pin bushing via a king pin bushing bore, through an elliptical bore in a control arm, and is secured with a floating king pin nut in tangent contact with a radiused lower surface of the control arm where the radiused lower surface of the control arm facilitates a pendulum, pivoting, and wobbling motion of the floating king pin,
    the control arm is securely connected with a hanger with an axle below the control arm, and an oversized bore above the control arm, wherein each end of the axle is connected with a laterally spaced wheel assembly resting on ground,
    the oversized bore hole sized to receive a fixed king pin where the fixed king pin and the floating king pin are perpendicular to each other and the fixed kin pin is nominally parallel with the ground when in use,
    a base securely connected with the frame and disposed between the hanger and the floating king pin, where the base has a fixed king pin bore,
    a deck securely connected with the frame where the deck is a tubular member capable of supporting a rider, spanning the rear truck assembly and a forward wheel assembly, and where the deck, frame, and base move in unison, the fixed king pin passes through the base via the fixed king pin bore, through a forward fixed king pin bushing, through the oversize bore in the hanger, through a rear fixed king pin bushing, connecting with a fixed king pin nut, wherein the base, frame, and deck rotate around the fixed king pin in response to lean steering input' wherein differential down force on the frame asymmetrically compresses the floating king pin bushing to commence a pendulum motion of the floating king pin, as constrained by the elliptical bore and radiused lower surface of the control arm to steer the rear wheel assemblies.

\* \* \* \* \*